R. E. KELLY.
TELESCOPING MUD GUARD.
APPLICATION FILED AUG. 4, 1910.

979,074.

Patented Dec. 20, 1910.

2 SHEETS—SHEET 1.

Witnesses

Inventor
R. E. Kelly
by H. B. Willson & Co.
Attorneys

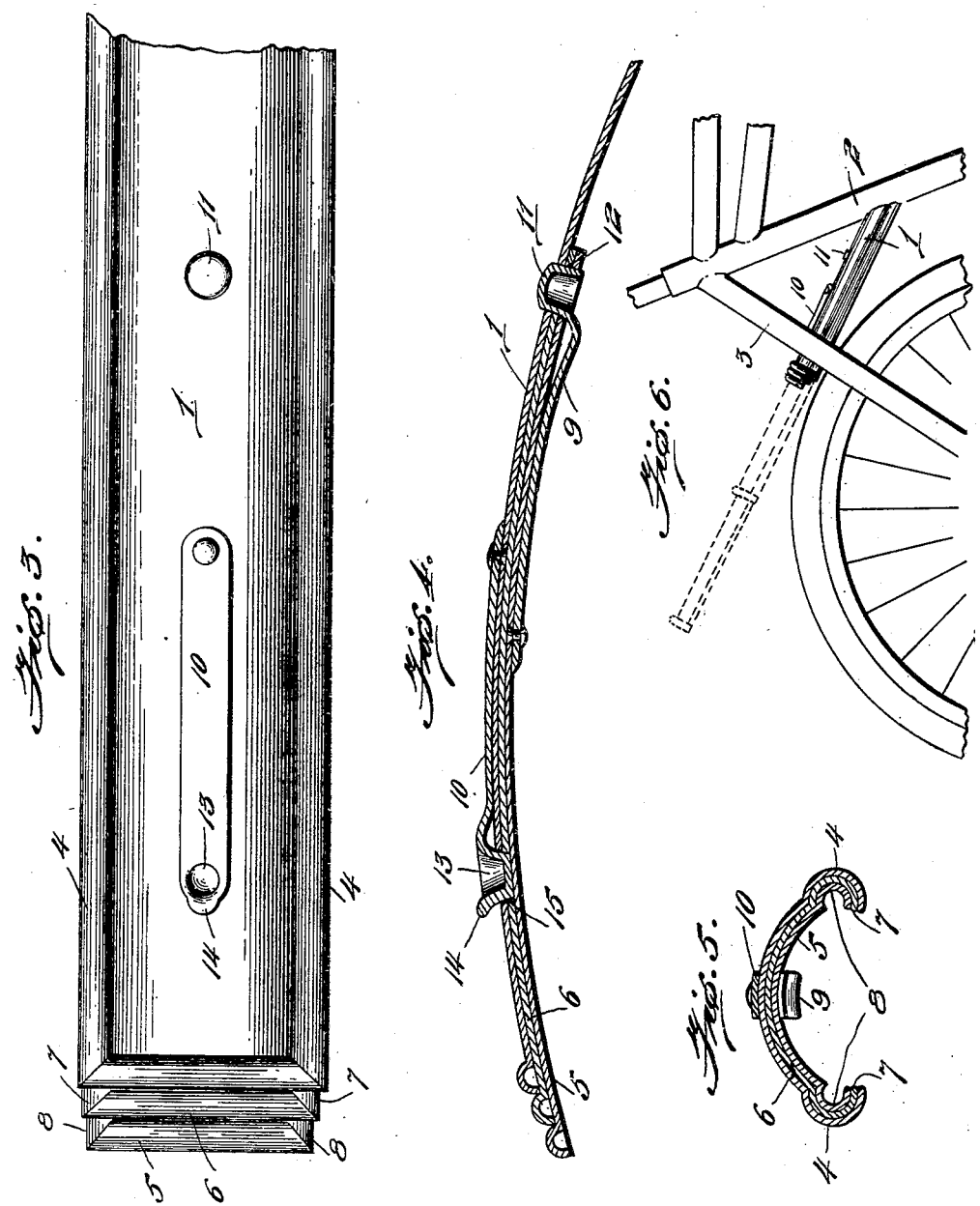

UNITED STATES PATENT OFFICE.

ROBERT EMMETT KELLY, OF COCOANUT GROVE, FLORIDA.

TELESCOPING MUD-GUARD.

979,074.  Specification of Letters Patent.  Patented Dec. 20, 1910.

Application filed August 4, 1910. Serial No. 575,485.

*To all whom it may concern:*

Be it known that I, ROBERT EMMETT KELLY, a citizen of the United States, residing at Cocoanut Grove, in the county of Dade and State of Florida, have invented certain new and useful Improvements in Telescoping Mud-Guards; and I do declare the following to be a full, clear, and exact description of the invention, such as will enable others skilled in the art to which it appertains to make and use the same.

This invention relates to improvements in telescoping mud guards for bicycles and other vehicles.

The object of the invention is to provide an improved construction of mud guard formed of a plurality of adjustably connected telescoping sections and having means to hold said sections in extended or retracted positions.

With the foregoing and other objects in view, the invention consists of certain novel features of construction, combination and arrangement of parts as will be more fully described and particularly pointed out in the appended claim.

Figure 1:
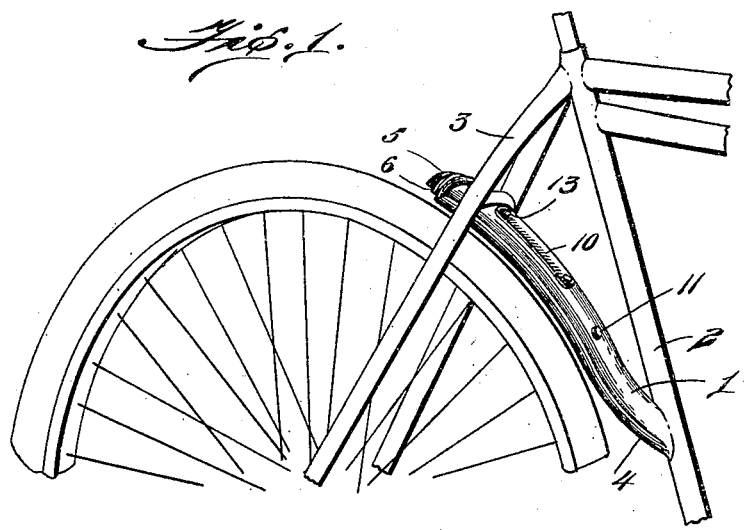
Figure 2:
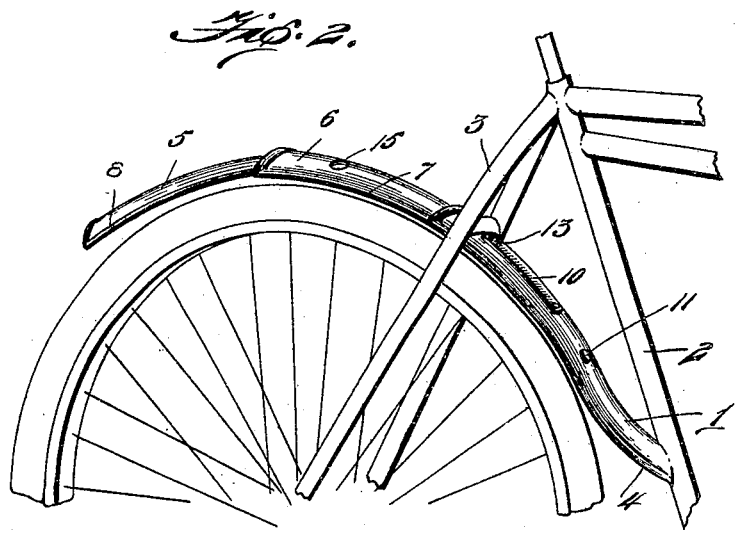

In the accompanying drawings: Figure 1 is a perspective view of a portion of a bicycle showing my invention applied thereto with the parts in retracted position; Fig. 2 is a similar view showing the parts in extended position; Fig. 3 is a top plan view of the guard showing the sections in retracted position; Fig. 4 is a central longitudinal section thereof; Fig. 5 is a vertical cross sectional view of the same; Fig. 6 is a side view of a portion of a bicycle frame and rear wheel illustrating a modified form of the invention and showing the parts in retracted position in full lines and in extended position in dotted lines.

In the practical embodiment of the invention I provide a casing 1, which is brazed or otherwise suitably connected at its forward end to the side post 2 of a bicycle frame and projects beyond and is secured between the upper portion of the rear forks 3 of the machine. The casing 1 is preferably curved transversely and is provided on its opposite side edges with longitudinally extending guide channels 4 the purpose of which will hereinafter appear.

Telescopically engaged with each other and with the casing 1 of the guard are inner and outer expansible sections 5 and 6 which are curved transversely to correspond with the transverse curvature of the casing 1 with which they are slidably engaged. On the outer longitudinal edges of the outer sections 6 are formed longitudinal guide channels 7 which are constructed similarly to the channels 4 of the casing and which are slidably engaged with said channels. On the side edges of the inner section 5 are formed beads 8 which are slidably engaged with the guide channels 7 of the outer sections. It will thus be seen that by providing the sections of the guard and the casing with the guide channels and beads as herein shown and described said sections may be readily slipped together or drawn apart and slipped into and out of the casing to retract and extend the guard.

In order to hold the sections of the guard in retracted and extended positions I provide suitable catches 9 and 10 which are preferably in the form of flat metal springs. The spring 9 is secured at one end to the inner section 5 of the guard adjacent to its inner end and said spring catch 9 has formed on its free end an upwardly projecting knob 11 which is adapted to project through alined apertures 12 formed in the inner end of the sections 5 and 6 of the guard and in the casing 1. The catch 10 is also in the form of a flat metal spring and is secured at one end to the casing 1 near the rear end thereof and is provided on its free end with a downwardly projecting knob or head 13 having a thumb piece 14. When the sections of the guard are in a retracted position the head 13 is adapted to engage apertures 15 formed in the casing and outer section of the guard thereby forming an additional means for holding the sections in a retracted position. When the sections are extended to their greatest extent, the head 13 will engage the aperture 12 formed in the inner end of the section 6 while the knob 11 will engage the aperture 15 in the forward end of the outer section thus securely fastening said sections together and to the casing when the sections are extended.

In the preferred form of the invention as shown in the first figures of the drawing, the guard is shown as constructed on a slight curve corresponding to the curvature of the wheel. It is obvious however, that if desired the guard may be formed straight as shown in Fig. 5 of the drawing.

By constructing the guard in telescoping sections as herein shown and described, the latter may be readily retracted or closed together when the guard is not needed and may be quickly drawn apart to an operative position when desired.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim is:

A mud guard comprising a fixed casing provided with longitudinal internal channels at its side edges and having an opening near its outer end, an intermediate member having openings near its ends adapted to register with the opening in the casing and provided in its side edges with internal channels and with external beads slidably engaging the channels of the casing, an inner member provided with an opening near its inner end and having beads on its side edges slidably engaging the channels in the intermediate member, a spring disposed longitudinally of said inner member and secured to the inner face thereof at one end and provided at its free end with a knob projecting through the opening in said member and adapted to engage the registering opening in the intermediate member, and a longitudinally disposed spring secured at one end to the outer face of the casing and provided near its free end with a knob adapted to project through the opening therein and engage the opening in the intermediate member.

In testimony whereof I have hereunto set my hand in presence of two subscribing witnesses.

ROBERT EMMETT KELLY.

Witnesses:
   J. S. PENT,
   G. S. AMSDEN.